United States Patent
Ho (10) Patent No.: US 11,528,528 B2
(45) Date of Patent: Dec. 13, 2022

(54) METHOD AND SYSTEM FOR CONTROLLING PROJECTOR

(71) Applicant: Coretronic Corporation, Hsin-Chu (TW)

(72) Inventor: Cheng-Tao Ho, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 146 days.

(21) Appl. No.: 17/100,919

(22) Filed: Nov. 22, 2020

(65) Prior Publication Data
US 2021/0168440 A1 Jun. 3, 2021

(30) Foreign Application Priority Data

Nov. 28, 2019 (CN) .......................... 201911190588.0

(51) Int. Cl.
*H04N 21/4363* (2011.01)
*H04N 21/41* (2011.01)

(52) U.S. Cl.
CPC ... *H04N 21/43632* (2013.01); *H04N 21/4122* (2013.01)

(58) Field of Classification Search
CPC ............ H04N 21/4122; H04N 21/414; H04N 21/43632; H04N 21/4424; H04N 21/443; G09G 3/001
See application file for complete search history.

(56) References Cited

U.S. PATENT DOCUMENTS

| | | | | |
|---|---|---|---|---|
| 6,652,104 B2* | 11/2003 | Nishida | ................ | H04N 9/3194 353/69 |
| 6,877,863 B2* | 4/2005 | Wood | ................... | H04N 9/3185 353/42 |
| 7,070,283 B2* | 7/2006 | Akutsu | ................ | H04N 9/3194 353/30 |
| 7,182,466 B2* | 2/2007 | Sunaga | ..................... | H04N 5/74 353/69 |
| 7,270,421 B2* | 9/2007 | Shinozaki | ............ | G03B 21/142 353/121 |
| 7,359,575 B2* | 4/2008 | Bassi | .................... | G06T 3/0093 345/427 |

(Continued)

FOREIGN PATENT DOCUMENTS

CN 104980322 10/2015
TW 200723091 6/2007

*Primary Examiner* — Michael B. Pierorazio
(74) *Attorney, Agent, or Firm* — JCIPRNET (57) ABSTRACT

The invention provides a method and a system for controlling a projector. The control method includes: obtaining a first trigger rule and a first to-be-executed action corresponding to the first trigger rule. The first trigger rule and the first to-be-executed action respectively include at least one of a plurality of combinable elements. The control method includes: determining whether the first trigger rule is satisfied and controlling the projector to execute the first to-be-executed action when the first trigger rule is determined as being satisfied. The control system includes a projector and a control device configured to execute the control method. The control method and system of the invention provide more diverse and flexible rules and action generation mechanisms, thereby implementing effects of product differentiation and intelligent operation.

24 Claims, 5 Drawing Sheets

(56) References Cited

U.S. PATENT DOCUMENTS

| | | | | |
|---|---|---|---|---|
| 7,441,906 B1* | 10/2008 | Wang | | G03B 21/14 |
| | | | | 353/121 |
| 7,782,387 B2* | 8/2010 | Azuma | | H04N 5/3572 |
| | | | | 359/662 |
| 2002/0051095 A1* | 5/2002 | Su | | H04N 9/3194 |
| | | | | 348/745 |
| 2002/0122161 A1* | 9/2002 | Nishida | | H04N 9/3194 |
| | | | | 353/70 |
| 2003/0191836 A1* | 10/2003 | Murtha | | H04L 67/02 |
| | | | | 709/224 |
| 2003/0210381 A1* | 11/2003 | Itaki | | H04N 5/74 |
| | | | | 353/70 |
| 2004/0156024 A1* | 8/2004 | Matsuda | | H04N 9/3185 |
| | | | | 353/70 |
| 2005/0046803 A1* | 3/2005 | Akutsu | | H04N 9/3194 |
| | | | | 353/69 |
| 2005/0073661 A1* | 4/2005 | Tamura | | H04N 9/3194 |
| | | | | 353/70 |
| 2005/0151934 A1* | 7/2005 | Akutsu | | G03B 21/147 |
| | | | | 353/69 |
| 2005/0237492 A1* | 10/2005 | Shinozaki | | H04N 9/3185 |
| | | | | 353/69 |
| 2006/0098167 A1* | 5/2006 | Sato | | G03B 21/26 |
| | | | | 353/35 |
| 2006/0203207 A1* | 9/2006 | Ikeda | | H04N 9/3185 |
| | | | | 353/70 |
| 2007/0008344 A1* | 1/2007 | Medina | | H04N 9/3185 |
| | | | | 345/647 |
| 2007/0257941 A1* | 11/2007 | Plut | | G06F 9/451 |
| | | | | 345/660 |
| 2007/0285626 A1* | 12/2007 | Miyasaka | | G03B 21/206 |
| | | | | 353/85 |
| 2009/0278999 A1* | 11/2009 | Ofune | | H04N 21/47 |
| | | | | 348/E3.048 |
| 2010/0002123 A1* | 1/2010 | Nozaki | | G03B 17/54 |
| | | | | 348/E5.022 |
| 2010/0045942 A1* | 2/2010 | Furui | | H04N 9/3194 |
| | | | | 353/69 |
| 2011/0085044 A1* | 4/2011 | Noda | | G03B 21/58 |
| | | | | 348/E5.133 |
| 2011/0210979 A1* | 9/2011 | Furui | | H04N 9/3147 |
| | | | | 345/619 |
| 2011/0234994 A1* | 9/2011 | Uchiyama | | H04N 9/3185 |
| | | | | 353/121 |
| 2011/0285971 A1* | 11/2011 | Oka | | H04N 9/3185 |
| | | | | 353/70 |
| 2011/0292351 A1* | 12/2011 | Ishii | | H04N 9/3185 |
| | | | | 353/69 |
| 2018/0158102 A1* | 6/2018 | Choi | | G06Q 30/0251 |

* cited by examiner

METHOD AND SYSTEM FOR CONTROLLING PROJECTOR

CROSS-REFERENCE TO RELATED APPLICATION

This application claims the priority benefit of China application serial no. 201911190588.0, filed on Nov. 28, 2019. The entirety of the above-mentioned patent application is hereby incorporated by reference herein and made a part of this specification.

BACKGROUND OF THE INVENTION

1. Field of the Invention

The invention relates to a projection technology, and in particular, to a method and a system for controlling a projector.

2. Description of Related Art

Scheduling systems of most projectors use time as a condition to trigger a specified action. For example, a user may turn on or off a projector at a time point in one day of every week, such as turning on at 8 am and turning off at 5 pm on every Monday to Friday, or turning on at 10 am and turning off at 8 pm on Saturday and Sunday. A main principle of such a scheduling system is to use a timer to check a current system time and to execute a corresponding action when the system time meets a specified time, such as turning on and off, checking a temperature, or sending an email to notify an administrator.

However, using a time as a trigger condition for the projector to execute an action may encounter the following problems: (1) the architecture is inflexible, thereby greatly limiting functions during use; (2) requirements of different users in different scenarios cannot be met; (3) there is no product differentiation.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a method and a system for controlling a projector, so that more diverse and flexible rules and action generation mechanisms can be provided, thereby implementing product differentiation and intelligent operating.

The invention provides a method for controlling a projector, including: obtaining a first trigger rule and a first to-be-executed action corresponding to the first trigger rule. The first trigger rule and the first to-be-executed action each include at least one of a plurality of combinable elements. The control method further includes: determining whether the first trigger rule is satisfied, and when it is determined that the first trigger rule is satisfied, controlling the projector to execute the first to-be-executed action.

The invention provides a system for controlling a projector, including a projector and a control device. The control device is electrically connected to the projector and configured to control the projector, and is configured to obtain a first trigger rule and a first to-be-executed action corresponding to the first trigger rule. The first trigger rule and the first to-be-executed action each include at least one of a plurality of combinable elements. The control device is further configured to: determine whether the first trigger rule is satisfied, and when it is determined that the first trigger rule is satisfied, control the projector to execute the first to-be-executed action.

Based on the above, in the invention, after the first trigger rule and the corresponding first to-be-executed action are obtained, it is determined whether the first trigger rule is satisfied, where the first trigger rule and the first to-be-executed action each may include one or more combinable elements. If the first trigger rule is satisfied, the corresponding first to-be-executed action is executed. According to the invention, a user can generate the first trigger rule and the first to-be-executed action corresponding to the first trigger rule by combining the one or more combinable elements, so that more diverse and flexible rules and action generation mechanisms can be provided, thereby implementing product differentiation and intelligent operating.

To make the features and advantages of the invention clear and easy to understand, the following gives a detailed description of the embodiments with reference to accompanying drawings.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
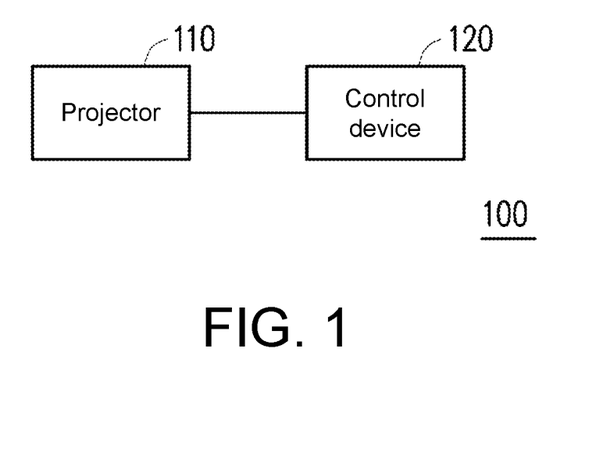
FIG. 1 is a schematic diagram of a control system according to an embodiment of the invention.

Referring to FIG. 1, FIG. 1 is a schematic diagram of a control system according to an embodiment of the invention. As shown in FIG. 1, a control system 100 includes a projector 110 and a control device 120. In different embodiments, the control device 120 is electrically connected to the projector 110, and the control device 120 is, for example, a personal computer, a mobile phone, a tablet computer, a notebook computer, or other devices externally connected to the projector 110 that can be used to manage the projector 110. Alternatively, the control device 120 may be a control element built into the projector 110, and may provide a specific operation interface for a user to adjust a system setting of the projector 110, but the invention is not limited thereto.

In the embodiment of the invention, the projector 110 or the control device 120 may include a storage device that may be configured to store one or more trigger rules and one or more to-be-executed actions corresponding to the one or more trigger rules. When the control device 120 determines that one of the trigger rules is satisfied, the projector 110 can be controlled to execute a to-be-executed action corresponding to the trigger rule. Different from the known technique that only time is used as a trigger condition, trigger rules and corresponding to-be-executed actions in the invention may be generated or combined in a more flexible manner, thereby providing a more diverse operating experience. Further description is provided below.

Figure 2:
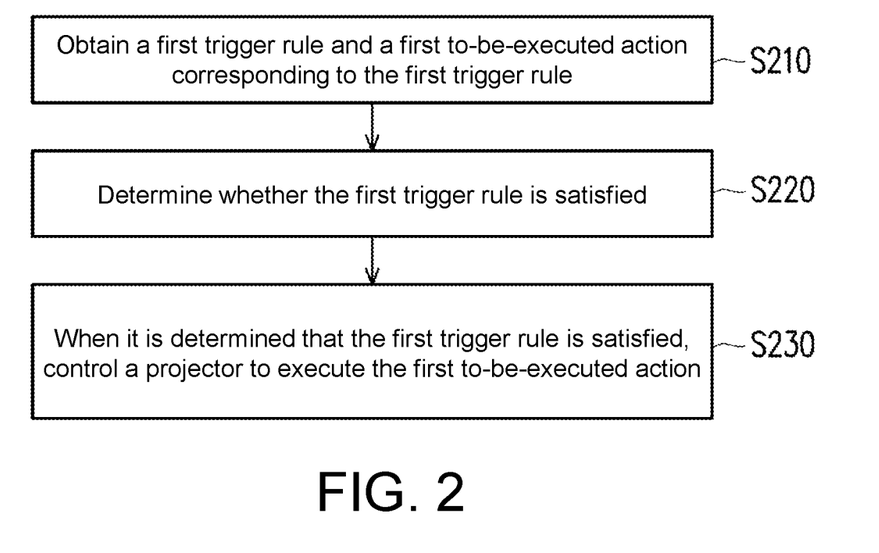
FIG. 2 is a schematic diagram of a control method according to an embodiment of the invention.

Referring to FIG. 2, FIG. 2 is a schematic diagram of a control method according to an embodiment of the invention. The method in the embodiment may be executed by the control system 100 in FIG. 1, and the following gives a description with reference to the elements in FIG. 1.

In step S210, the control device 120 may obtain a first trigger rule and a first to-be-executed action corresponding to the first trigger rule, where the first trigger rule and the first to-be-executed action each may include at least one of a plurality of combinable elements.

In step S220, the control device 120 may determine whether the first trigger rule is satisfied. Then, in step S230, when it is determined that the first trigger rule is satisfied, the control device 120 may control the projector 110 to execute the first to-be-executed action.

In a further embodiment, that the control device 120 obtains the first trigger rule and the first to-be-executed action is further described with reference to the accompanying drawings.

Figure 3:
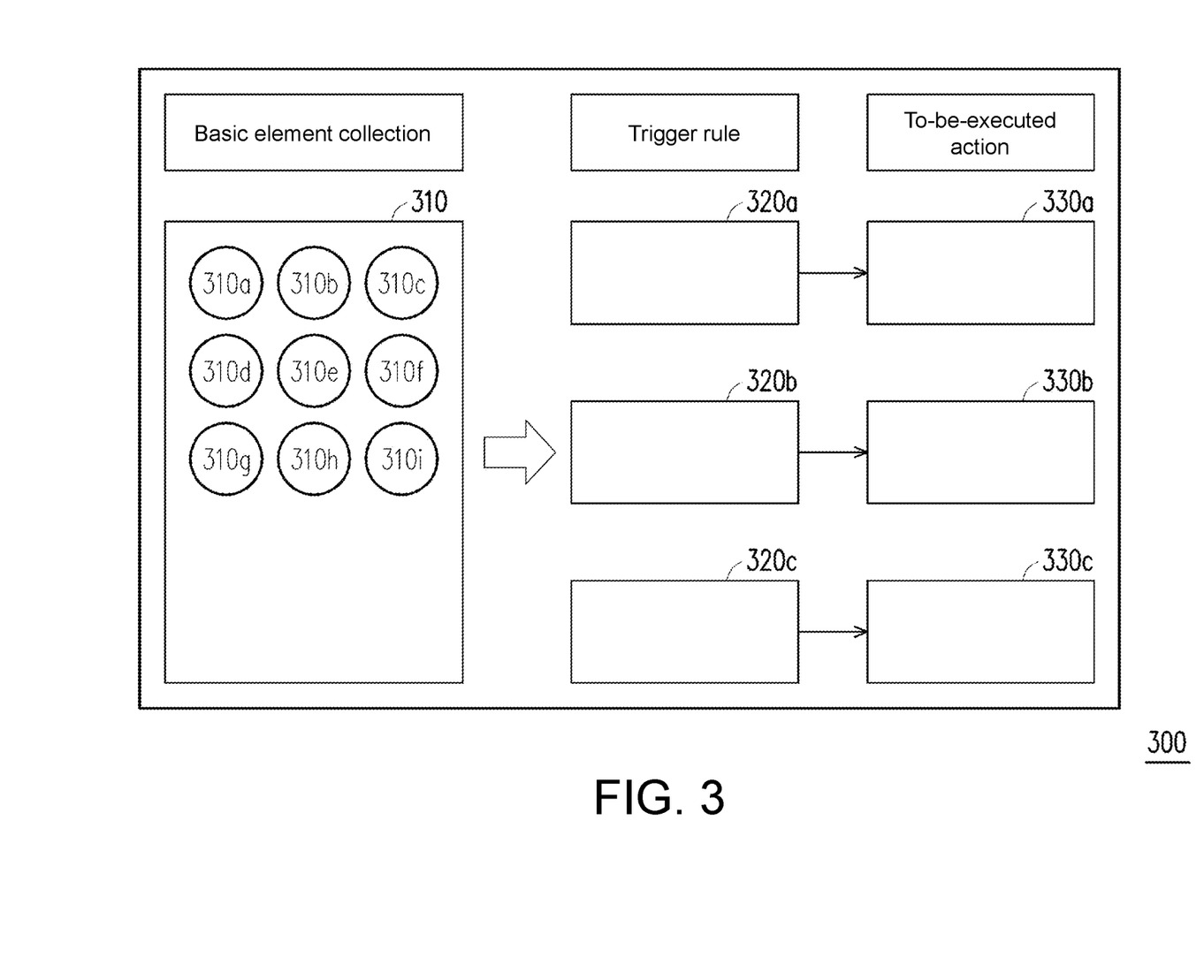
FIG. 3 is a schematic diagram of an operation interface according to an embodiment of the invention.

Referring to FIG. 3, FIG. 3 is a schematic diagram of an operation interface according to an embodiment of the invention. As shown in FIG. 3, the control device 120 may provide an operation interface 300. The operation interface 300 may include an element collection framework 310, rule setting frameworks 320a, 320b, and 320c, and action setting frameworks 330a, 330b, and 330c. In the embodiment, the rule setting frameworks 320a, 320b, and 320c may respectively correspond to the action setting frameworks 330a, 330b, and 330c.

In the embodiment, the element collection framework 310 may include combinable elements 310a to 310i. In general, the combinable elements 310a to 310i may be selectively added to the rule setting frameworks 320a to 320c or the action setting frameworks 330a to 330c. For example, the combinable elements 310a to 310c may be selected to be added to the rule setting framework 320a, and the combinable elements 310d to 310f may be selected to be added to the action setting framework 330a. In this case, when one or more trigger conditions formed by the combinable elements 310a to 310c in the rule setting framework 320a are partially or totally satisfied (depending on a logical relationship between the combinable elements 310a to 310c), the projector 110 may execute one or more actions defined by the combinable elements 310d to 310f in the action setting framework 330a. To better illustrate the foregoing concepts, a plurality of examples are supplemented for description below.

Figure 4A:
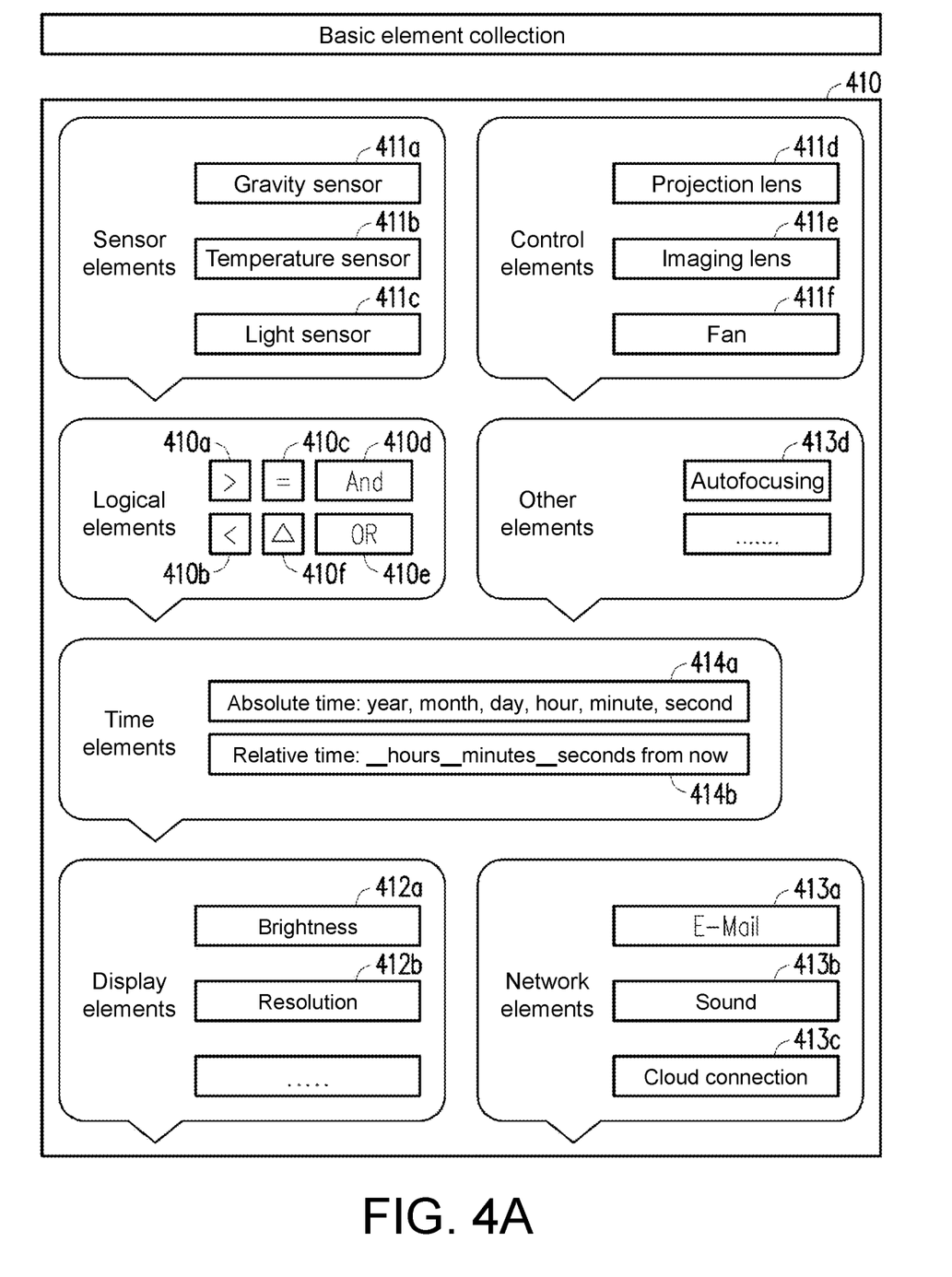
FIG. 4A is a schematic diagram of an element collection framework according to an embodiment of the invention.

Referring to FIG. 4A, FIG. 4A is a schematic diagram of an element collection framework according to an embodiment of the invention. In the embodiment, combinable elements in an element collection framework 410 may include a plurality of logical elements 410a to 410f, a plurality of projector element elements 411a to 411f (for example, sensor elements 411a, 411b, and 411c and control elements 411d, 411e, and 411O, a plurality of projector setting elements (for example, display elements 412a and 412b), a plurality of projector operation elements 413a to 413d (for example, network elements 413a, 413b, and 413c and other elements 413d), and time elements 414a and 414b, but the invention is not limited thereto.

In an embodiment, the logical elements 410a to 410f may be respectively being greater than, being less than, being equal to, logical AND, logical OR, and a variation, but the invention is not limited thereto. In an embodiment, in the projector element elements 411a to 411f, the sensor elements 411a, 411b, and 411c may respectively correspond to a gravity sensor, a temperature sensor, and a light sensor, and the control elements 411d, 411e, and 411f may respectively correspond to a projection lens, an imaging lens, and a fan, but the invention is not limited thereto. In FIG. 4A, in the projector setting elements, for example, the display elements 412a and 412b may respectively correspond to a brightness setting and a resolution setting. However, in other embodiments, the projector setting elements may further include, for example, combinable elements corresponding to a keystone correction, a colour setting, a signal source selection, and a contrast setting, and the invention is not limited thereto.

As shown in FIG. 4A, in the projector operation elements, the network elements 413a, 413b, and 413c may respectively correspond to, for example, sending an email, making a sound, and establishing a cloud connection, and the other elements 413d may correspond to, for example, an autofocus action. However, in other embodiments, the projector operation elements may include, for example, combinable elements corresponding to turning on, turning off, capturing a projection picture, and adjusting a system configuration of the projector 110 according to a system configuration of another projector, and the invention is not limited thereto. The time elements 414a and 414b may be respectively used to allow the user to set an absolute time and a relative time. For example, the projector 110 may be set such that the projector 110 executes a specific action at the absolute time or the projector 110 executes a specific action after a time interval.

In addition, for ease of understanding, as shown in FIG. 4A, the foregoing combinable elements may be roughly classified into sensor elements, control elements, logical elements, other elements, time elements, display elements, and network elements, and the like, but the invention is not limited thereto.

Figure 4B:
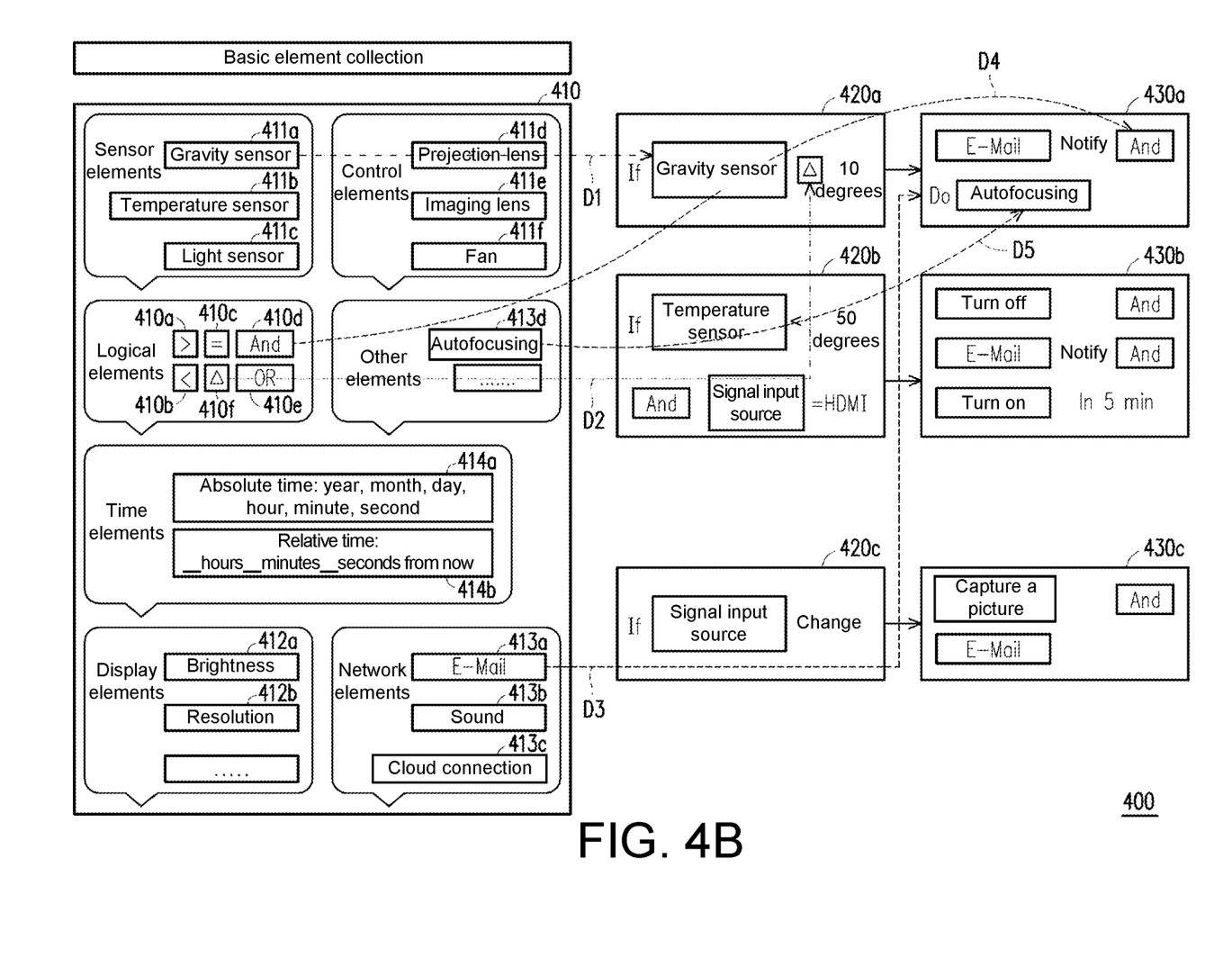
FIG. 4B is a schematic diagram of an operation interface according to FIG. 4A.

Referring to FIG. 4B, FIG. 4B is a schematic diagram of an operation interface according to FIG. 4A. In the embodiment, the user may selectively add one or more combinable elements in the element collection framework 410 to a rule setting framework 420a or an action setting framework 430a through a predefined selection operation. For example, the selection operation may be dragging. In this case, the user may drag each combinable element into the rule setting framework 420a or the action setting framework 430a. Accordingly, each element in the rule setting framework 420a and the action setting framework 430a may be added or removed through a drag operation. In some embodiments, the element collection framework 410, rule setting frameworks 420a to 420c, and action setting frameworks 430a to 430c of the operation interface may receive the selection operation (for example, dragging), so that each element can be added to or removed from each of the frameworks. For example, when a combinable element is moved to a framework through dragging, the combinable element is displayed in the framework.

Taking FIG. 4B as an example, the user inputs a plurality of selection operations (for example, drag operations D1 and D2) through the operation interface 400. The selection operation D1 is to add the sensor element 411a (for example, corresponding to the gravity sensor) in the projector element elements to the rule setting framework 420a, and the selection operation D2 is to add the logical element 410f (for example, corresponding to the variation) to the rule setting framework 420a. In this case, the sensor element 411a and the logical element 410f in the rule setting framework 420a may be combined into a trigger rule, meaning "if a variation of a value measured by the gravity sensor reaches X degrees", where the X degrees may be set by the user (for example, 10 degrees illustrated in FIG. 4B). In the embodiment, the trigger rule thus established may correspond to the first trigger rule obtained by the control device 120 in step S210.

Similarly, the user inputs a plurality of selection operations D3, D4, and D5 through the operation interface 400. The selection operations D3 to D5 may be respectively used to add the network element 413a (corresponding to sending an email), the logical element 410d (corresponding to logical AND), and other elements 413d (for example, corresponding to executing autofocus) in the projector operation elements to the action setting framework 430a. In this case, the network element 413a, the logical element 410d, and the other elements 413d in the action setting framework 430a may be combined into a to-be-executed action. In this case, the trigger rule may be the first trigger rule obtained by the control device 120 in step S210, meaning "sending an email and executing autofocus". In the embodiment, the to-be-executed action thus established may correspond to the first to-be-executed action obtained by the control device 120 in step S210, where the first to-be-executed action corresponds to the first trigger rule.

After step S210, the control device 120 may determine whether the first trigger rule is satisfied (step S220). For example, the control device 120 may determine whether the variation of the value measured by the gravity sensor reaches 10 degrees. When it is determined that the first trigger rule is satisfied (that is, the variation of the value measured by the gravity sensor reaches 10 degrees), the control device 120 may control the projector 110 to execute the corresponding first to-be-executed action (step S230), that is, sending an email and executing autofocus.

Based on the above, different from the known technique that only time is used a basis for determining whether to execute a specific action, in the method of the invention, various combinable elements may be combined to generate many different trigger rules and corresponding to-be-executed actions as required, so that diversity and flexibility of the operation can be improved, thereby implementing product differentiation and intelligent operating.

In other embodiments, the user may input a plurality of selection operations through the operation interface 400 to establish other trigger rules and corresponding to-be-executed actions. Taking the rule setting framework 420b in FIG. 4B as an example, the trigger rule displayed by the rule setting framework 420b means, for example, "if a value measured by the temperature sensor is less than 50 degrees and an signal input source is HDMI". Correspondingly, the to-be-executed action displayed by the action setting framework 430b means, for example, "turning off, sending an email, and turning on after 5 minutes".

After the foregoing step, the control device 120 may determine whether the first trigger rule is satisfied (step S220). For example, the control device 120 may determine whether the value (that is, a temperature) measured by the temperature sensor is less than 50 degrees and whether the signal input source is HDMI. When it is determined that the first trigger rule is satisfied (that is, the temperature is less than 50 degrees and the signal input source is HDMI), the control device 120 may control the projector 110 to execute the corresponding first to-be-executed action (step S230), that is, turning off, sending an email, and turning on after 5 minutes.

In another embodiment, taking the rule setting framework 420c in FIG. 4B as an example, the trigger rule may be set to "if the signal input source changes". Correspondingly, in the action setting framework 430c, the to-be-executed action can be set to "taking a photo and sending an email".

In the embodiment, after obtaining or establishing the first trigger rule and the corresponding first to-be-executed action (step S210), the control device 120 may determine whether the first trigger rule is satisfied (step S220), that is, determine whether the signal input source changes. When it is determined that the first trigger rule is satisfied (that is, the signal input source changes), the control device 120 may control the projector 110 to execute the corresponding first to-be-executed action (step S230), that is, taking a photo and sending an email.

In addition, persons of ordinary skill in the art should understand that the trigger rule and the to-be-executed actions shown in FIG. 4B are only examples, and are not intended to limit possible implementations of the invention. That is, the user can generate many trigger rules and corresponding to-be-executed actions as required. For example, based on the foregoing teachings, the user may establish the first trigger rule "if brightness measured by the light sensor is higher than an 0 value" (the 0 value can be set by the user) and the first to-be-executed action "reducing projection brightness". In this way, when determining that the brightness measured by the light sensor is higher than the 0 value, the control device 120 may automatically control the projector 110 to reduce the projection brightness, but the invention is not limited thereto.

In an embodiment, the element collection framework 410 may further include combinable elements associated with other projectors, so that a plurality of projectors can be set to implement more diversified rule settings and action settings. For example, the combinable elements may include an identification element and/or a system configuration element corresponding to another projector.

For example, if the first to-be-executed action obtained by the control device 120 includes the system configuration element of the another projector, when the control device 120 determines that the first trigger rule is satisfied, the control device 120 may adjust a system configuration of the projector 110 according to the system configuration of the another projector. In addition, for other projectors, the system configuration of the projector 110 can also be regarded as the system configuration of the another projector, so that the user can set trigger rules and to-be-executed actions for the other projectors.

In other embodiments, the identification element of the another projector may be used as a combinable element to set the first trigger rule. When performing determining in step S220, the control device 120 may further access the identification element and a corresponding operating status of the another projector (for example, gravity sensor information and signal input source information of the another projector) to assist the determining.

In an embodiment, identification elements and system configuration elements of other projectors may be provided by a cloud server. In particular, the cloud server may be configured to collect and store information (such as an experience database shown in FIG. 5) about one or more projectors, and convert the information into corresponding combinable elements for each projector to access.

In an embodiment, a combinable element may appear in both a trigger rule and a to-be-executed action. For example, a combinable element in the first trigger rule may be at least partially the same as a combinable element in the first to-be-executed action. For example, a combinable element corresponding to a lens may be used as an element of a trigger rule or as an element of a to-be-executed action.

In some embodiments, the control system in the embodiment of the invention may further set a conflict resolution mechanism. When it is determined that a plurality of trigger rules are satisfied, a to-be-executed action corresponding to each of the trigger rules is executed according to a specific order.

It can be learned from the above that the method provided in the embodiment of the invention allows the user to set one or more first trigger rules and one or more corresponding first to-be-executed actions as required through the operation interface. However, in other embodiments, the control device 120 in the invention may obtain the first trigger rule and the corresponding first to-be-executed action in other manners.

In an embodiment, the control device 120 may obtain preset trigger rules and to-be-executed actions, where each of the preset trigger rules and/or to-be-executed actions may be established jointly by the projector 110 and the another projector. In an embodiment, the control device 120 may obtain, for example, a preset trigger rule and to-be-executed action from the cloud server, or directly obtain a preset trigger rule and to-be-executed action from the another projector.

For example, the projector 110 may pre-establish a preset trigger rule and a corresponding to-be-executed action with the another projector. In this case, the control device 120 may directly/indirectly obtain these preset trigger rules and to-be-executed actions as the trigger rules and to-be-executed actions of the projector 110, and these preset trigger rules and to-be-executed actions may be displayed on the operation interface (such as the operation interface 300 in FIG. 3) for user's reference and selection. In this way, the user does not need to establish the first trigger rule and the first to-be-executed action through dragging or the like, thereby improving convenience in operation.

In another embodiment, the control device 120 may obtain a field type of a field in which the projector 110 is located. For example, the control device 120 may provide a menu on the operation interface. The menu may include a plurality of preset field types, such as a banquet hall, a dark field environment, and a conference room, for user's selection. In this case, the control device 120 may obtain a trigger rule and a to-be-executed action based on the field type of the field in which the projector 110 is located. In other words, the user may perform setting according to the specific field in which the projector 110 is located, but the invention is not limited thereto. Because the preset trigger rule and to-be-executed action obtained by the control device 120 correspond to the specific field of the projector 110, the invention can further enhance an intelligent effect of the projector 110 and the control device 120.

Figure 5:
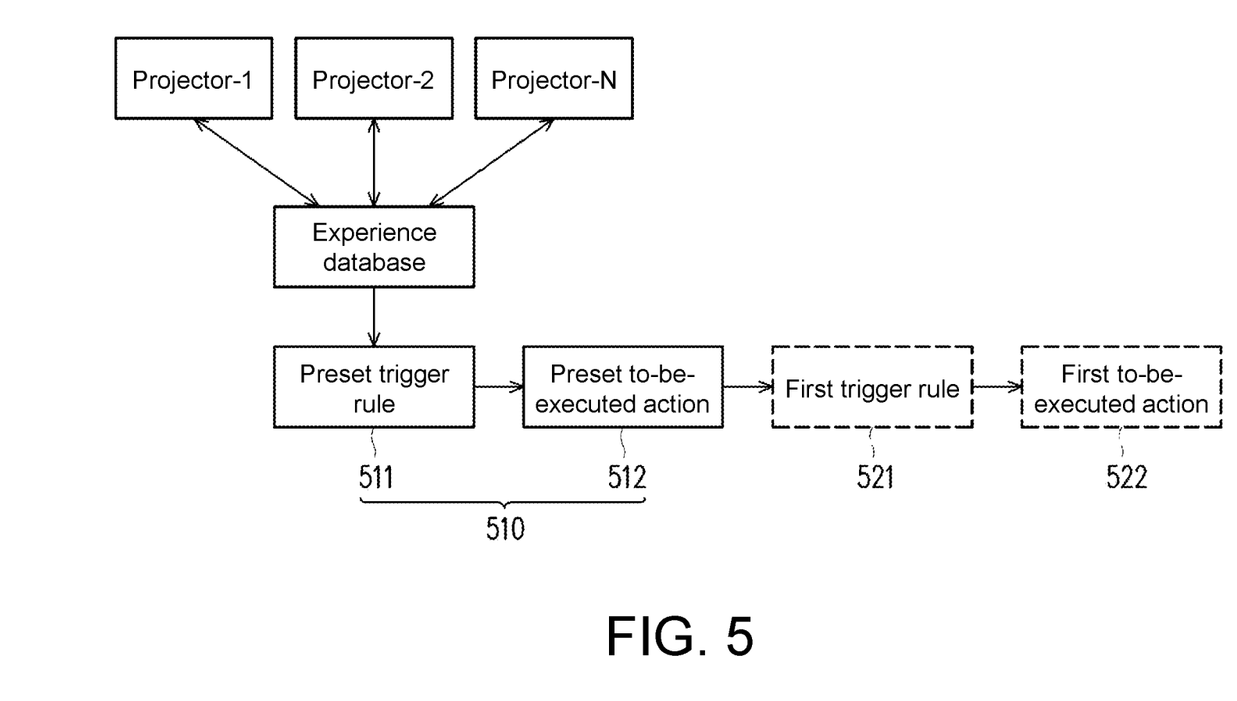
FIG. 5 is a schematic diagram of a scenario according to first and second embodiments of the invention.

Referring to FIG. 5, FIG. 5 is a schematic diagram of a scenario according to first and second embodiments of the invention. In the embodiment, for example, trigger rules and corresponding to-be-executed actions previously established by a plurality of projectors may be recorded in the experience database and recommended to the projector 110 and the control device 120 as a preset combination 510 (which may include a preset trigger rule 511 and a corresponding preset to-be-executed action 512). In an embodiment, the experience database may be maintained, for example, by the aforementioned cloud server, but the invention is not limited thereto.

As shown in FIG. 5, after the preset trigger rule 511 and the preset to-be-executed action 512 (that is, the preset combination 510) are selected, the control device 120 may set the preset trigger rule 511 and the preset to-be-executed action 512 in the preset combination 510 as a first trigger rule 521 and a first to-be-executed action 522 of the projector 110.

In view of the above, in the invention, after the first trigger rule and the corresponding first to-be-executed action are obtained, it is determined whether the first trigger rule is satisfied, where the first trigger rule and the first to-be-executed action each may include one or more combinable elements. If the first trigger rule is satisfied, the corresponding first to-be-executed action is executed. According to the invention, the user can generate the first trigger rule and the first to-be-executed action corresponding to the first trigger rule by combining the one or more combinable elements, so that more diverse and flexible rules and action generation mechanisms can be provided, thereby implementing product differentiation and intelligent operating. Further, in the embodiment of the invention, the user may set preset trigger rules and to-be-executed actions stored in the other projectors or the cloud server as the trigger rule and the to-be-executed action of the projector, thereby improving convenience in operation. Furthermore, the user may further set better trigger rules and execute actions according to the field type of the field in which the projector is located, thereby further improving an intelligent effect of the projector and the control device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A method for controlling a projector, comprising:
   obtaining a first trigger rule and a first to-be-executed action corresponding to the first trigger rule, wherein the first trigger rule and the first to-be-executed action each comprises at least one of a plurality of combinable elements, wherein the step of obtaining the first trigger rule and the first to-be-executed action corresponding to the first trigger rule comprises:
      providing an operation interface, wherein the operation interface comprises an element collection framework, a rule setting framework, and an action setting framework, wherein the element collection framework comprises the plurality of combinable elements and the action setting framework corresponds to the rule setting framework;
      receiving a first selection operation through the operation interface, wherein the first selection operation is to add a first combinable element of the plurality of combinable elements to the rule setting framework and combine the first combinable element into the first trigger rule; and
      receiving a second selection operation through the operation interface, wherein the second selection operation is to add a second combinable element of the plurality of combinable elements to the action setting framework and combine the second combinable element into the first to-be-executed action;
   determining whether the first trigger rule is satisfied; and
   controlling the projector to execute the first to-be-executed action when the first trigger rule is determined as being satisfied.

2. The control method according to claim 1, wherein the first trigger rule comprises a first combinable element of the plurality of combinable elements, the first to-be-executed action comprises a second combinable element of the plurality of combinable elements, and the first combinable element is partially the same as the second combinable element.

3. The control method according to claim 1, wherein the plurality of combinable elements comprise a system configuration element of another projector and when the first to-be-executed action comprises the system configuration element of the another projector, the step of controlling the projector to execute the corresponding first to-be-executed action comprises:
   adjusting a system configuration of the projector according to the system configuration element of the another projector.

4. The control method according to claim 1, wherein the step of obtaining the first trigger rule and the first to-be-executed action corresponding to the first trigger rule comprises:
   obtaining a plurality of preset combinations of trigger rules and to-be-executed actions, wherein each preset combination comprises a preset trigger rule and a corresponding preset to-be-executed action, wherein each preset combination is jointly established by the projector and another projector;
   displaying the plurality of preset combinations on an operation interface;
   selecting one of the plurality of preset combinations; and
   setting the first trigger rule and the first to-be-executed action according to the one of the plurality of preset combinations.

5. The control method according to claim 1, wherein the step of obtaining the first trigger rule and the first to-be-executed action corresponding to the first trigger rule comprises:
   obtaining a field type of a field in which the projector is located;
   obtaining a plurality of preset combinations of trigger rules and to-be-executed actions based on the field type, wherein each preset combination comprises a preset trigger rule and a corresponding preset to-be-executed action, and each preset combination is jointly established by the projector and another projector, wherein the projector and the another projector are located in a same field or similar fields;
   displaying the plurality of preset combinations with an operation interface;
   selecting one of the plurality of preset combinations; and
   setting the first trigger rule and the first to-be-executed action corresponding to the first trigger rule according to the one of the plurality of preset combinations.

6. The control method according to claim 1, wherein the plurality of combinable elements comprise at least one of a plurality of logical elements, a plurality of projector element elements, a plurality of projector setting elements, a plurality of projector operation elements, and a plurality of time elements.

7. The control method according to claim 6, wherein the plurality of logical elements comprise at least one of being greater than, being less than, being equal to, logical AND, logical OR, and a variation.

8. The control method according to claim 6, wherein the plurality of projector element elements comprise sensor elements and control elements, wherein the sensor elements comprise elements respectively corresponding to a gravity sensor, a temperature sensor, and a light sensor, and the control elements comprise elements respectively corresponding to a projection lens, an imaging lens, and a fan.

9. The control method according to claim 6, wherein the plurality of projector setting elements comprise display elements, and the display elements comprise elements respectively corresponding to a brightness setting, a keystone correction, a colour setting, a signal source selection, a resolution setting, and a contrast setting.

10. The control method according to claim 6, wherein the plurality of projector operation elements comprise network elements, the network elements comprising elements respectively corresponding to the following: sending an email, turning on, turning off, capturing a projection picture, autofocusing, and adjusting a system configuration of the projector according to a system configuration of another projector.

11. The control method according to claim 1, wherein the plurality of combinable elements comprise an identification element and a system configuration element of another projector.

12. A system for controlling a projector, comprising a projector and a control device, wherein
the control device is electrically connected to the projector, controls the projector, and is configured to:
obtain a first trigger rule and a first to-be-executed action corresponding to the first trigger rule, wherein the first trigger rule and the first to-be-executed action respectively comprise at least one of a plurality of combinable elements, wherein obtaining the first trigger rule and the first to-be-executed action corresponding to the first trigger rule comprises:
providing an operation interface, wherein the operation interface comprises an element collection framework, a rule setting framework, and an action setting framework, wherein the element collection framework comprises the plurality of combinable elements and the action setting framework corresponds to the rule setting framework;
receiving a first selection operation through the operation interface, wherein the first selection operation is to add a first combinable element of the plurality of combinable elements to the rule setting framework and combine the first combinable element into the first trigger rule; and
receiving a second selection operation through the operation interface, wherein the second selection operation is to add a second combinable element of the plurality of combinable elements to the action setting framework and combine the second combinable element into the first to-be-executed action;
determine whether the first trigger rule is satisfied; and
control the projector to execute the first to-be-executed action when the first trigger rule is determined as being satisfied.

13. The control system according to claim 12, wherein the first trigger rule comprises a first combinable element of the plurality of combinable elements, the first to-be-executed action comprises a second combinable element of the plurality of combinable elements, and the first combinable element is partially the same as the second combinable element.

14. The control system according to claim 12, wherein the plurality of combinable elements comprise a system configuration element of another projector, and when the first trigger rule comprises the system configuration element of the another projector, the control device is configured to:
adjust a system configuration of the projector according to the system configuration element of the another projector.

15. The control system according to claim 12, wherein the control device is configured to:
obtain a plurality of preset combinations of trigger rules and to-be-executed actions, wherein each preset combination comprises a preset trigger rule and a corresponding preset to-be-executed action, wherein each preset combination is jointly established by the projector and another projector;
display the plurality of preset combinations with an operation interface;
select one of the plurality of preset combinations; and
set the first trigger rule and the first to-be-executed action corresponding to the first trigger rule according to the one of the plurality of preset combinations.

16. The control system according to claim 12, wherein the control device is configured to:
obtain a field type of a field in which the projector is located;
obtain a plurality of preset combinations of trigger rules and to-be-executed actions based on the field type, wherein each preset combination comprises a preset trigger rule and a corresponding preset to-be-executed action, and each preset combination is jointly established by the projector and another projector, wherein the projector and the another projector are located in a same field or similar fields;
display the plurality of preset combinations with an operation interface;
select one of the plurality of preset combinations; and
set the first trigger rule and the first to-be-executed action corresponding to the first trigger rule according to the one of the plurality of preset combinations.

17. The control system according to claim 12, wherein the plurality of combinable elements comprise at least one of a plurality of logical elements, a plurality of projector element elements, a plurality of projector setting elements, a plurality of projector operation elements, and a plurality of time elements.

18. The control system according to claim 17, wherein the plurality of logical elements comprise at least one of being greater than, being less than, being equal to, logical AND, logical OR, and a variation.

19. The control system according to claim 17, wherein the plurality of projector element elements comprise sensor elements and control elements, wherein the sensor elements comprise elements respectively corresponding to a gravity sensor, a temperature sensor, and a light sensor, and the control elements comprise elements respectively corresponding to a projection lens, an imaging lens, and a fan.

20. The control system according to claim 17, wherein the plurality of projector setting elements comprise display elements and the display elements comprise elements respectively corresponding to a brightness setting, a keystone correction, a colour setting, a signal source selection, a resolution setting, and a contrast setting.

21. The control system according to claim 17, wherein the plurality of projector operation elements comprise network elements and the network elements comprise elements respectively corresponding to the following: sending an email, turning on, turning off, capturing a projection picture, autofocusing, and adjusting a system configuration of the projector according to a system configuration of another projector.

22. The control system according to claim 12, wherein the plurality of combinable elements comprise an identification element and a system configuration element of another projector.

23. The control system according to claim 12, wherein the control device is built into the projector.

24. The control system according to claim 12, wherein the control device is externally connected to the projector.

* * * * *